Nov. 29, 1927.

W. H. ODIORNE 1,650,767

HITCH DEVICE FOR TRUCK

Filed July 16, 1925

Witness
Milton Lenoir

Inventor
William H. Odiorne,
By John L. Lanier,
Attorney

Patented Nov. 29, 1927.

1,650,767

UNITED STATES PATENT OFFICE.

WILLIAM H. ODIORNE, OF CHICAGO, ILLINOIS, ASSIGNOR TO MERCURY MANUFACTURING COMPANY, OF CHICAGO, ILLINOIS, A CORPORATION OF ILLINOIS.

HITCH DEVICE FOR TRUCKS.

Application filed July 16, 1925. Serial No. 43,899.

My invention has to do with devices for hitching together a number of trucks of the trailer type in a train so that the train can be conveniently hauled from place to place by a motor. Such trailers are commonly used on or about railway station platforms, warehouses, industrial plants, etc., and have to travel over uneven road conditions, that is to say, up and down runways between floors or platforms on different levels so that at times the leading trailer will be higher or lower than the following one that is hitched to it. It is, of course, necessary that the hitch device used for connecting the trailers in series, or to the tractor by which they are drawn, be capable of adapting itself to such conditions, and, therefore, such hitch devices have usually been arranged to swing vertically when in operative position. A well-known hitch device of this kind is in the form of a member pivotally connected at one end with the front end of the trailer and having a hook at its opposite end adapted to engage an eye secured to the rear end of the leading trailer. Such hitch device has also been arranged to swing up out of operative position when not in use and to be automatically held in such position, as is desirable so that the hitch device will not be in the way at times when its service is not required.

Such hitch devices as heretofore constructed have not, however, been entirely satisfactory because in running a train of trailers over an uneven road or runway the forward or hook end of the hitch device would be apt to slide down into the eye of the leading trailer with which it engages and lock itself in that position; at the same time the rear end of the hitch device would slide up on the pivot bolt by which it is connected to the trailer and become rigid therewith, so that the front end of the trailer to which it was attached would ride up in the air. These occurences are objectionable because when the forward or hook end of the hitch device becomes locked to the eye as above explained it has to be released by hand, and the tipping up of the front end of the trailer not only endangers its load, but also it is necessary to lift the forward part of the trailer by hand somewhat higher before the hitch device can be returned to its normal position. To provide an improved hitch device which will not be subject to these objections is the object of my present invention, which object I accomplish as illustrated in the drawings and hereinafter described. What I regard as new is set forth in the claims.

In the accompanying drawings,—

Figure 1:
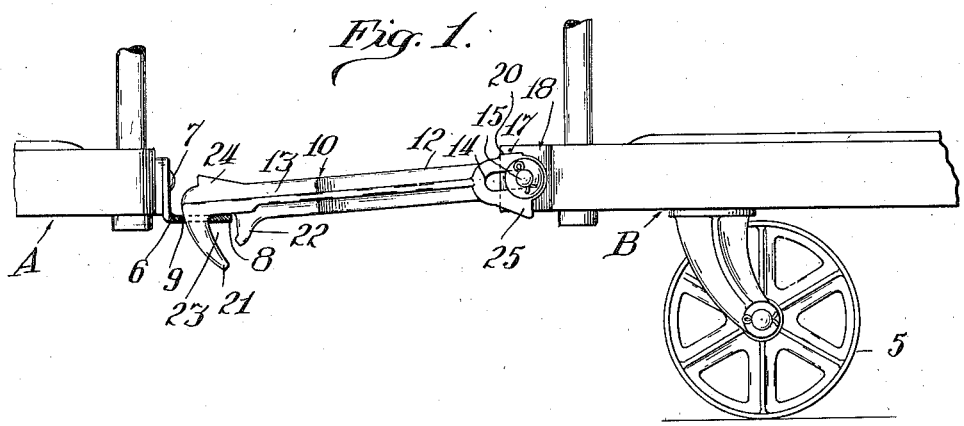
Fig. 1 is a side elevation showing my improved hitch device in operative position to connect two trailers together, parts only of the trailers being shown, and the eye of the leading trailer being shown partly in section.
Figure 2:
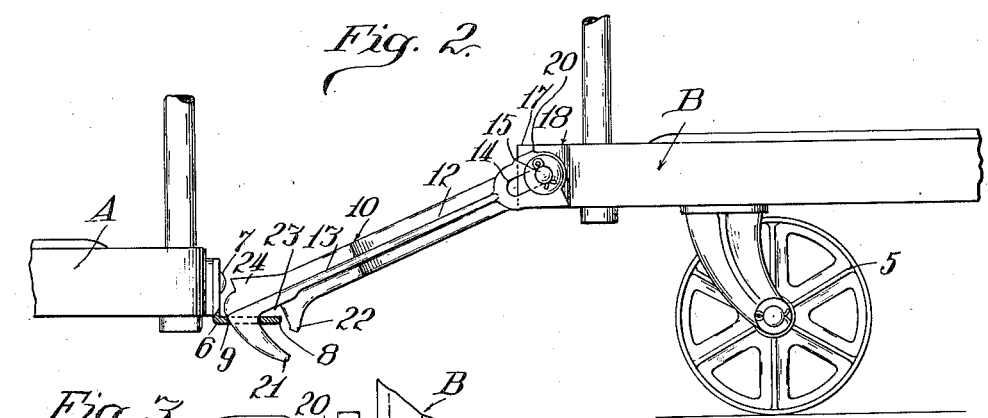
Fig. 2 is a similar view showing the position of the hitch device when the trailers are on different levels, with the leading trailer on a lower level than the following one.

Referring to the drawings,—A, B indicate two trailers, A being the leading trailer and B the following one which is hitched to it and drawn by it. It will be understood that the several trailers are provided with front caster wheels 5 so that they trail readily after the tractor or other draft element. As shown in Figs. 1 and 2, each of the trailers is provided at its rear end with what is commonly termed an eye 6, which is preferably in the form of an angle plate fixedly secured to the rear of the trailer by rivets 7 or other suitable means and having a horizontally disposed portion 8 provided with a hole 9 which serves as a rigid coupling link.

Figure 3:
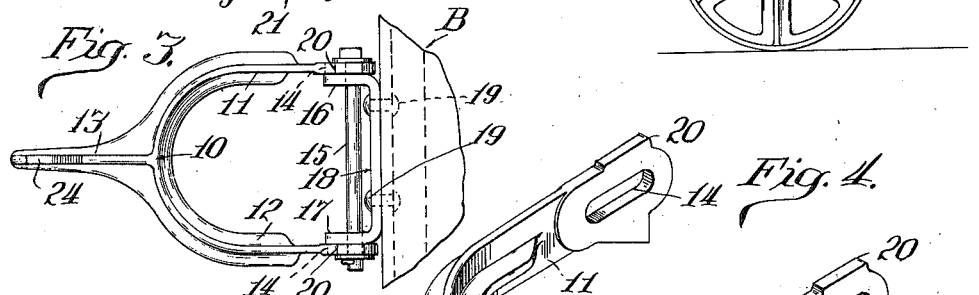
Fig. 3 is a plan view of the hitch device, with a portion of the trailer to which it is pivotally connected.
Figure 4:
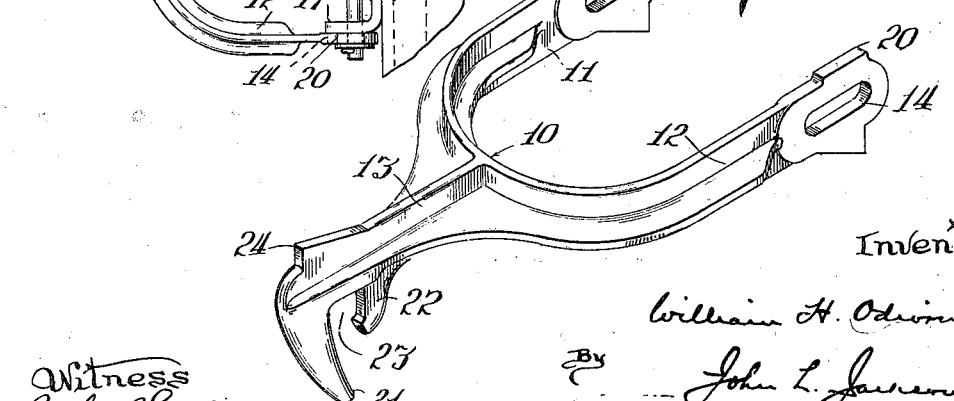
Fig. 4 is a perspective view of my improved hitch device.

The hitch device by which two trailers are coupled together is best shown in Fig. 4, from which it will be seen that it comprises a yoke like member 10 having rearwardly extending arms 11, 12 spaced apart and in parallel relation to each other, and a forwardly-extending arm 13 positioned in the median line of the hitch device considered as whole. The rearwardly-extending arms 11, 12 are each provided with a longitudinal slot 14 near their rear ends, through which slots passes a bolt 15 that forms a pivot for the hitch member, said bolt being mounted in the arms 16, 17 of a U-shaped bar 18 fixedly secured to the front end of the trailer, preferably by rivets 19 as shown in Fig. 3. The arms 16, 17 extend forward and preferably bear against the inner faces of the arms 11, 12 of the hitch member. By this construction the hitch member may swing vertically about the pivot 15 as an axis and by lifting the front end of the hitch member high enough so that the rear arms thereof may drop until the pivot 15 lies in the forward ends of the slots 14 the hitch member will be held in an approximately upright position. This is due to the fact that at that time the upper margins of the rear end portions of the arms 11, 12 will then bear against the forward end of the trailer frame at a point below the pivot 15, which, of course, prevents the front end of the hitch member from swinging downward. Preferably the arms 11, 12 are provided with lugs 20 at their upper rear marginal portions to hold the hitch member in a more nearly upright position when it is swung upward as above described.

The forward arm 13 of the hitch member is provided at its front end with a downwardly-extending horn or hook 21 which is adapted to engage the eye 9, and opposite such hook a finger 22 is provided, forming a channel 23 in which the rear part of the horizontal portion 8 of the eye lies when the hitch member is in operative position. This finger serves to prevent displacement of the hook when the train is backed.

For preventing the hook 21 from sliding down into the eye 9 to a point where it would become locked, as would otherwise be apt to occur when the leading trailer is on a considerably lower level than the following trailer, the arm 13 is provided at its upper margin near its front end with an upwardly extending projection or lug 24 so placed that it is adapted to engage the rear of the frame of the leading trailer A, or the forward portion of member 6 in front of eye 9, when the hitch member is tipped downward beyond a certain point, so as to prevent the hook from moving into the eye beyond a predetermined point. To prevent the rear end of the hitch member from sliding up on the pivot 15 in the manner above described should its hook end tip downward, the arms 11, 12 are provided near their rear ends with downwardly extending projections or lugs 25 which are adapted to engage the front end portion of the frame of the following trailer B, when the hook end of the hitch member drops, as shown in Fig. 2, and so prevent upward and rearward movement thereof. Said lugs also limit the downward movement of the hook end. The lugs 24, 25 therefore, cooperate to maintain the hitch member in its proper operative position notwithstanding any difference in the levels on which two consecutive trailers are running, thereby accomplishing the stated purpose of my invention.

What I claim as my invention and desire to secure by Letters Patent, is—

1. A hitch device comprising a vertically swinging member having a closed longitudinally extending slot at one end, a pivot extending through said slot for connecting said hitch member with a trailer, a downwardly extending hook at the opposite end of said hitch member, and a downwardly extending lug on said hitch member underlying said slot and adapted to engage the end of the trailer for limiting upward movement of said slotted end toward the trailer.

2. A hitch device comprising a vertically swinging member having a longitudinally extending slot in its rear end, the sides of said slot being substantially parallel to each other and being closed, a pivot extending through said slot for connecting said hitch member with the trailer, a downwardly extending hook at the forward end of said hitch member, and a downwardly extending lug on said hitch member spaced forwardly from the rear end of said hitch member and adapted to engage the end of said trailer for limiting the upward and rearward movement of the slotted end of said hitch member.

3. The combination with a pair of vehicles, of a hitch device for coupling said vehicles comprising a vertically swinging member adapted to be pivotally mounted at one end on one of said vehicles and having a downwardly extending hook at the other end adapted to engage in an eye rigidly secured to the other vehicle, said hook having pivotal movement in a vertical plane in said eye, and an upwardly extending lug on said hitch member over said hook and spaced from the adjacent end of the hitch member and adapted to engage the end of said second vehicle for limiting the extent to which the hook end of said hitch member may project through said eye.

4. The combination with a trailer, of a hitch device comprising a vertically swinging member having a closed longitudinally extending slot at its rear end, a pivot extending through said slot for connecting said hitch member with the trailer, a downwardly extending hook at the forward end of said hitch member, and means adjacent to the slotted end of said hitch member for limiting the upward and rearward movement of said slotted end.

5. The combination with a trailer, of a hitch device comprising a vertically swinging member having a closed longitudinally extending slot at its rear end, a pivot extending through said slot for connecting said hitch member with the trailer, a downwardly extending hook at the forward end of said hitch member, and a downwardly extending projection adjacent to the slotted end of said hitch member for limiting the upward and rearward movement of said slotted end.

6. The combination with a trailer, of a hitch device comprising a vertically swinging member having a longitudinally extending slot at its rear end, a pivot extending through said slot for connecting said hitch member with the trailer, a downwardly extending hook at the forward end of said hitch member adapted to have vertical pivotal movement in an eye carried by a leading trailer, and means adjacent to said hook for limiting the extent to which it may project through said eye.

7. The combination with a trailer, of a hitch device comprising a vertically swinging member having a longitudinally extending slot at its rear end, a pivot extending through said slot for connecting said hitch member with the trailer, a downwardly extending hook at the forward end of said hitch member adapted to have vertical pivotal movement in an eye carried by a leading trailer, and an upwardly extending projection adjacent to said hook for limiting the extent to which it may project through said eye.

8. The combination with a trailer, of a hitch device comprising a vertically swinging member having a completely closed longitudinally extending slot at its rear end, a pivot extending through said slot for connecting said hitch member with the trailer, a downwardly extending hook at the forward end of said hitch member, means adjacent to the slotted end of said hitch member for limiting the upward and rearward movement of said slotted end, and means adjacent to said hook for limiting the extent to which it may project through an eye carried by a leading trailer.

9. The combination with a trailer, of a hitch device comprising a vertically swinging member having a completely closed longitudinally extending slot at its rear end, a pivot extending through said slot for connecting said hitch member with the trailer, a downwardly extending hook at the forward end of said hitch member adapted to have vertical pivotal movement in an eye rigidly carried by a leading trailer, a downwardly extending projection adjacent to the slotted end of said hitch member for limiting the upward and rearward movement of said slotted end, and an upwardly extending projection adjacent to said hook for limiting the extent to which it may project through said eye.

WILLIAM H. ODIORNE.